3,574,216
QUATERNARY 3-PYRIDINIUM-2-QUINOLONES
Stanley C. Bell, Penn Valley, Pa., assignor to American
Home Products Corporation, New York, N.Y.
No Drawing. Filed Apr. 12, 1968, Ser. No. 721,095
Int. Cl. C07d 33/50
U.S. Cl. 260—288
3 Claims

ABSTRACT OF THE DISCLOSURE

Quaternary 3-pyridinium-2-quinolones, particularly inner salts of 3-pyridinium 6-chloro-1,2-dihydro-4-substituted-2-oxoquinolines (I), especially the 4-(2-chloro-5-sulfamoylphenyl) derivative thereof bearing a 3-[1-hydroxy-N-(p-tolylsulfonyl)formamidoyl] group on the pyridinium ring thereof (Ia), and the 4-hydroxy derivative thereof (Ib), are prepared from the corresponding 2-pyridinium acetanilide (II) by heating until cyclization is substantially complete or by treatment with a base, respectively. Compounds (I) and (II) are pharmacologically active, especially as central nervous system depressants.

This invention relates to derivatives of quinolones, and more particularly to quaternary 3-pyridinium-2-quinolones having pharmacological activity and to valuable intermediates for their preparation.

DESCRIPTION OF THE INVENTION

The compounds of this invention are those of Formula I:

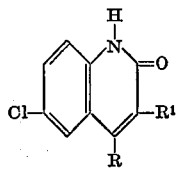

wherein (a) R is

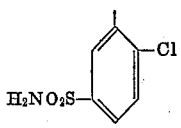

and R¹ is

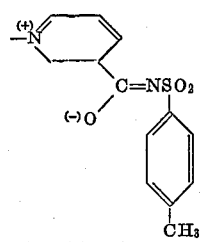

or (b) R is.

and R¹ is

As specific embodiments of this invention there are mentioned 1 - [6 - chloro-4-(2-chloro-5-sulfamoylpheny)-1,2 - dihydro - 2 - oxoquinolin-3-yl]-3-[1-hydroxy-N-(p-tolylsulfonyl)-formamidoyl]pyridinium hydroxide, inner salt, a compound of Formula Ia:

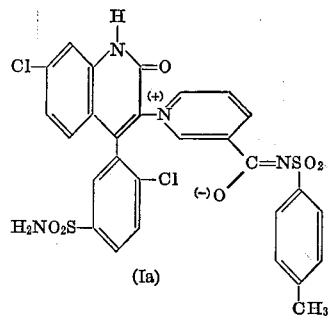

and
1 - [6 - chloro - 1,2 - dihydro - 4 - hydroxy-2-oxoquinolin-3-yl]-pyridinium hydroxide, inner salt, a compound of Forumla Ib:

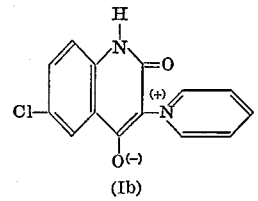

Compounds of Formula I (including Ia and Ib) are pharmacologically active as central nervous system depressants and are of value to induce calming.

Also contemplated are compounds of Formula II:

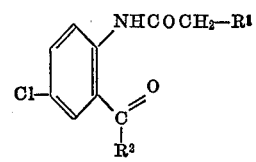

wherein (a) R¹ is

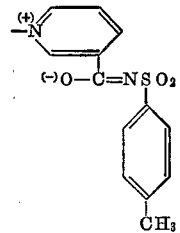

and R² is

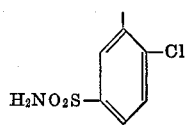

or (b) R¹ is

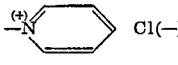

and R² is —OC₂H₅.

As specific embodiments of this invention there are mentioned 1-([4 - chloro - 2 - (2 - chloro-5-sulfamoylbenzoyl)phenylcarbamoyl]methyl) - 3 - [1-hydroxy-N-

(p-tolylsulfonyl)formamidoyl]pyridinium hydroxide, inner salt, a compound of Formula IIa:

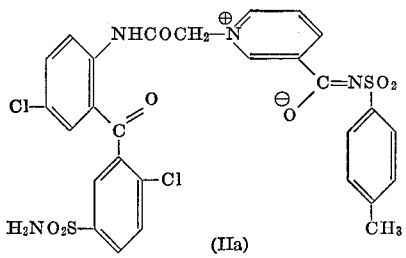

1-([2 - carboxy - 4 - chlorophenyl)carbamoyl]-methyl) pyridinium chloride, ethyl ester, a compound of Formula IIb:

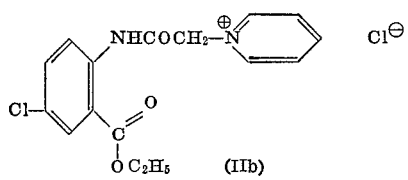

As will be shown hereinafter, compounds of Formula II are valuable as intermediates in the preparation of compounds of Formula I. In addition they are valuable per se, possessing activity in standard pharmacological tests as central nervous system depressants and are of value to induce calming.

The compounds of this invention can be prepared from readily accessible starting materials by a number of different procedures. Convenient pathways are outlined as follows:

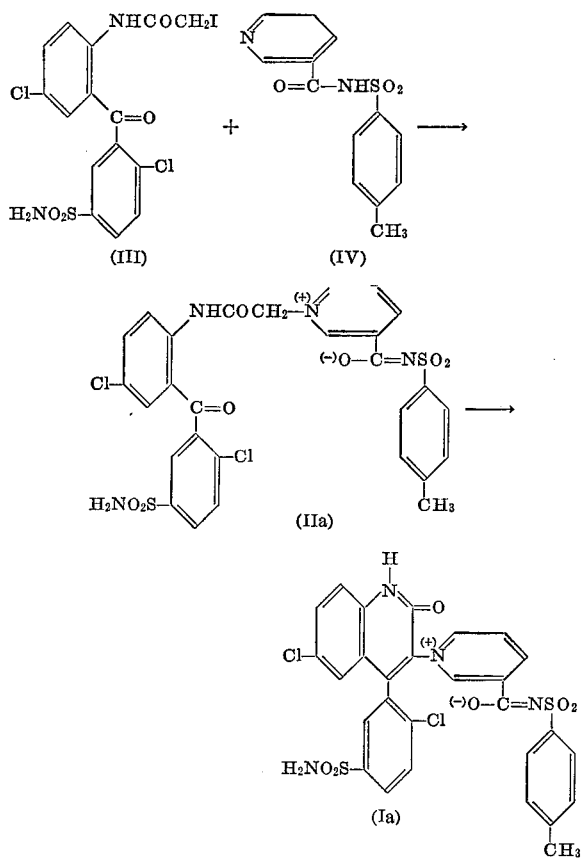

In this pathway, a mixture of the appropriately-substituted benzophenone (III), prepared as described in Example I of the copending application of Stanley C. Bell and George L. Conklin, Ser. No. 614,805, filed Feb. 9, 1967, now U.S. 3,458,501 granted July 29, 1969, and the stoichiometrical amount of the substituted nicotinamide (IV) in about 30 parts by weight of acetone is refluxed until the reaction is substantially complete, about 24 hours is sufficient, and then the mixture is allowed to cool to about 22° C., whereupon the compound of Formula IIa precipitates and can be recovered, for example by filtration. This is converted to the quinolone (Ia) by mixing it with about 10 parts of a high boiling solvent, such as dimethylformamide and heating the mixture, preferably at reflux, until formation of the inner salt is substantially complete (about 10 minutes is sufficient). Cooling the mixture to about 22° C. and diluting it with several volumes of water causes the product to precipitate and it can be recovered, e.g., by filtration. If desired the compound of Formula Ia can be purified by dissolving it in a solution of sodium hydroxide in aqueous ethanol, then precipitating it with acetic acid.

A convenient pathway to make the compounds of the instant invention also is outlined as follows:

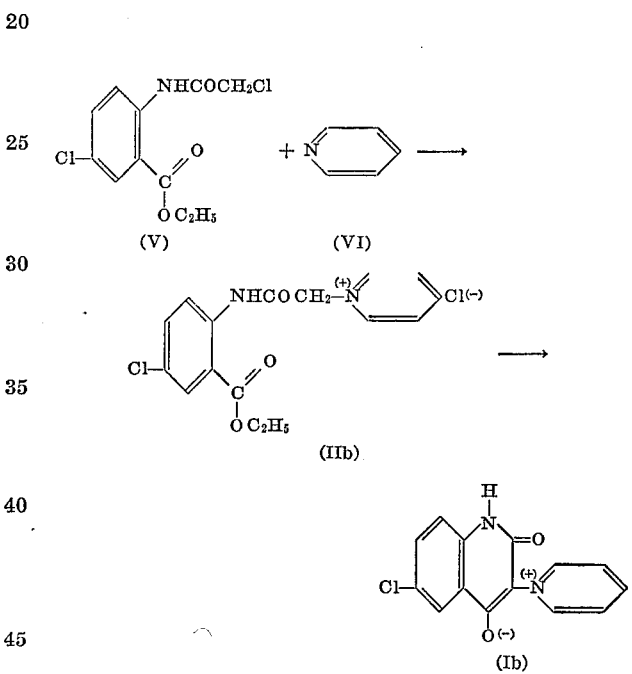

In this pathway, a mixture of 2'-carbethoxy-2,4'-dichloroacetanilide V and about 25 parts by weight of pyridine VI are heated, preferably at reflux until the reaction is substantially complete (about 0.5 hr. at reflux temperature), then cooled to about 22° C., whereupon the product (IIb) precipitates from the mixture. It is purified by heating in dimethylformamide, cooling and filtering then washing with ethanol. Compound IIb is dissolved in water, rendered acidic with a base, such as sodium hydroxide, and a compound precipitates out. The mixture is acidified, e.g., with hydrochloric acid, heated to boiling and enough co-solvent, e.g., ethanol is added to dissolve all of the solid. Cooling the mixture causes precipitation of product Ia, which can be purified, if desired by recrystallization from a mixture of dimethylformamide and water.

The compounds of Formulae I and II of this invention have demonstrated pharmacological activity. In particular they have been found to exert a depressant action on the central nervous system when tested under standard and accepted pharmacological procedures in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents, such as the need to induce a calming effect.

The compounds of Formulae I and II of this invention may be administered either alone or in combination with other pharmacologically-active ingredients. Whether singly or in combination, they may be used in the form of solid compositions for oral administration combined, if desired, with extenders or carriers that are relatively non-toxic or inert. They may be put into tablet, capsule or powder form. On the other hand, they may be administered in liquid form as a suspension or solution in a suitable vehicle for parenteral use. By way of illustration pharmacological action as central nervous system depressant agents in mice has been demonstrated when compounds of this invention have been administered at dosages of 40, 127 and 400 mg./kg.

DESCRIPTION OF THE PREFERRED EMBODIMENTS

The following examples are given by way of illustration and are not to be construed as limitations of this invention, many variations of which are possible without departing from the scope and spirit thereof.

EXAMPLE 1

1 - ([4-chloro - 2 - (2-chloro-5-sulfamoyl-benzoyl)phenyl carbamoyl]methyl) - 3 - [1 - hydroxy - N - (p - tolylsulfonyl)formamidoyl]pyridinium hydroxide, inner salt A mixture of 3.5 g. of 4'-chloro-2'-(2-chloro-5-sulfamoylbenzoyl)-2-iodoacetanilide, 4.4 g. of N - (p - tolylsulfonyl)nicotinamide and 200 ml. of acetone is refluxed for 24 hr. and cooled to give 2.2 g. of product, M.P. 269–271° C.

Analysis.—Calcd. for $C_{28}H_{22}Cl_2N_4O_7S_2$ (percent): Cl, 10.72 N, 8.47; S, 9.70. Found (percent): Cl, 10.74; N, 8.46; S, 9.53.

EXAMPLE 2

1 - [6 - chloro - 4 - (2 - chloro - 5 - sulfamoylphenyl)- 1,2 - dihydro - 2 - oxoquinolin - 3 - yl] - 3 - [1 - hydroxy - N - (p - tolylsulfonyl)formamidoyl]pyridinium hydroxide, inner salt A mixture of 1.9 g. of 1-([4-chloro-2-(2-chloro-5-sulfamoylbenzoyl)phenylcarbamoyl]methyl) - 3 - [1 - hydroxy - N - (p - tolylsulfonyl)formamidoyl]pyridinium hydroxide, inner salt, and 20 ml. of dimethylformamide is heated to boiling for 10 min., cooled and diluted with water to give 1.7 g. of white solid product. The product is purified by dissolving the solid in aqueous ethanol with sodium hydroxide and reprecipitating the compound with acetic acid.

Analysis.—Calcd. for $C_{28}H_{20}Cl_2N_4O_6S_2$ (percent): C, 52.26; H, 3.13; Cl, 11.02; N, 8.71; S, 9.97. Found (percent): C, 52.03; H, 3.14; Cl, 10.76; N, 8.50; S, 9.80.

EXAMPLE 3

1 - ([(2 - carboxy - 4 - chlorophenyl)carbamoyl]methyl) pyridinium chloride, ethyl ester A mixture of 10 g. of 2'-carbethoxy-2,4'-dichloroacetanilide and 250 ml. of pyridine is refluxed for 0.5 hr. and cooled to yield 12.5 g. of product. The solid is heated in dimethylformamide, cooled and filtered and is washed with ethanol.

Analysis. — Calcd. for $C_{16}H_{16}Cl_2N_2O_3 \cdot \frac{1}{2}H_2O$ (percent): C, 52.76; H, 4.71; Cl, 19.47; N, 7.69. Found (percent): C, 52.71; H, 4.82; Cl, 18.84; N, 7.71.

EXAMPLE 4

1-[6-chloro-1,2-dihydro-4-hydroxy-2-oxoquinolin 3-yl]-pyridinium hydroxide, inner salt A mixture of 1.0 g. of 1-([(2-carboxy - 4 - chlorophenyl)carbamoyl]methyl)pyridinium chloride, ethyl ester, is dissolved in water and made basic with sodium hydroxide and a yellow solid precipitates out. The reaction mixture is acidified with hydrochloric acid and heated to boiling and ethanol is added until all the solid has dissolved. On cooling, 0.8 g. of solid is collected, M.P. 300° C. Recrystallization from dimethylformamide-water gives bright yellow fibers.

Analysis.—Calcd. for $C_{14}H_9ClN_2O_2$: (percent): C, 61.66; H, 3.33; Cl, 13.00; N, 10.27. Found (percent): C, 61.02; H, 3.75; Cl, 12.72; N, 10.16.

In evaluating the instant compounds for pharmacological activity, they are tested in vivo by standard methods with the following results.

The compound is administered to three mice (CF–1 14 to 24 grams) at each of the following doses: 400, 127, 40 and 12.7 mg./kg.

The animals are watched for signs of general stimulation, general depression and automatic activity and the observations are evaluated by methods described in detail in Turner, Screening Methods in Pharmacology, Academic Press, New York, p. 80 (1965), in the section entitled "A Test Group for Central Depressants."

1-[6-chloro - 4 - (2-chloro - 5 - sulfamoylphenyl)-1,2-dihydro - 2 - oxoquinolin - 3 - yl]-3-[1-hydroxy-N-(p-tolylsulfonyl)formamidoyl]-pyridinium hydroxide, inner salt, administered intraperitoneally in saline, caused decreased motor activity and decreased respiration at 400 mg./kg.; 1-([4-chloro - 2 - (2 - chloro-5-sulfamoylbenzoyl)phenylcarbamoyl]methyl) - 3 - [1 - hydroxy-N-(p-tolylsulfonyl)formamidoyl]pyridinium hydroxide, inner salt, administered intraperitoneally in saline, caused decreased motor activity at 40 mg./kg. and decreased respiration at 127 mg./kg.; and 1-([(2-carboxy - 4 - chlorophenyl)carbamoyl]methyl)pyridinium chloride, ethyl ester, administered intraperitoneally in saline, caused decreased motor activity at 40 mg./kg.

What is claimed is:

1. A compound of the formula:

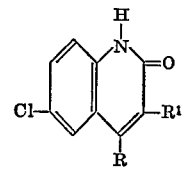

wherein (a) R is

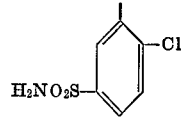

and $R^1$ is

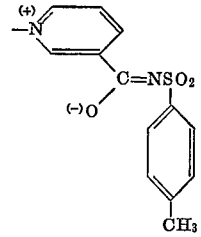

or (b) R is

and $R^1$ is

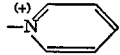

2. A compound as defined in claim 1 which is 1-[6-chloro - 4 - (2 - chloro - 5 - sulfamoylphenyl)-1,2-dihydro - 2 - oxoquinolin - 3 - yl] - 3 - [1-hydroxy-N-(p - toylsulfonyl)formamidoyl]pyridinium hydroxide, inner salt.

3. A compound as defined in claim 1 which is 1-[6-chloro - 1,2 - dihydro - 4 - hydroxy - 2 - oxoquinolin-3-yl]pyridinium hydroxide, inner salt.

References Cited

UNITED STATES PATENTS

| 3,419,563 | 12/1968 | Knupfer | 260—288 |
| 3,458,501 | 7/1969 | Bell | 260—239.5 |
| 3,509,156 | 4/1970 | Wei | 260—287 |
| 3,514,459 | 5/1970 | Ritter | 260—287 |

DONALD G. DAUS, Primary Examiner

U.S. Cl. X.R.

260—288, 294.8, 295.5, 556, 562; 424—258